UNITED STATES PATENT OFFICE.

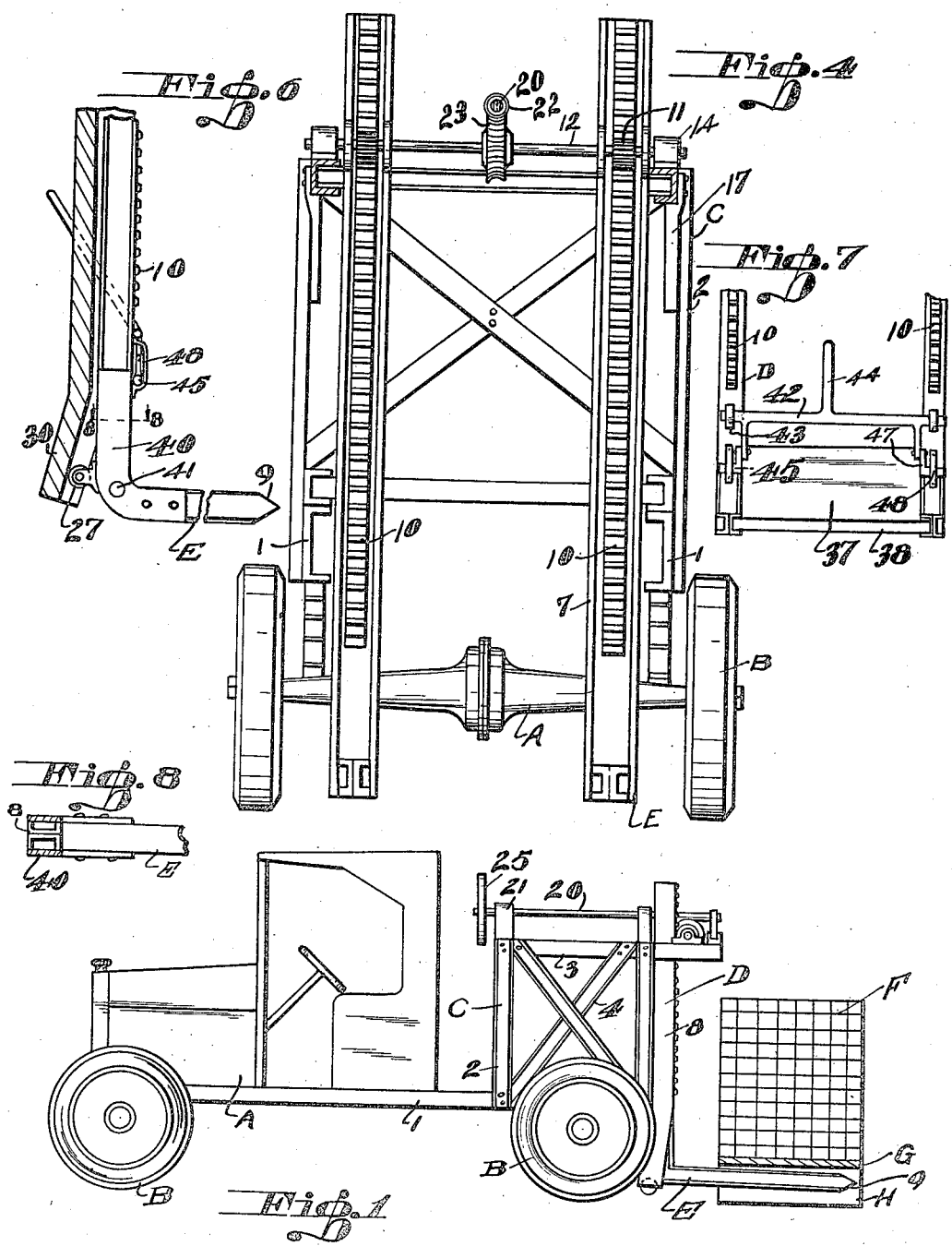

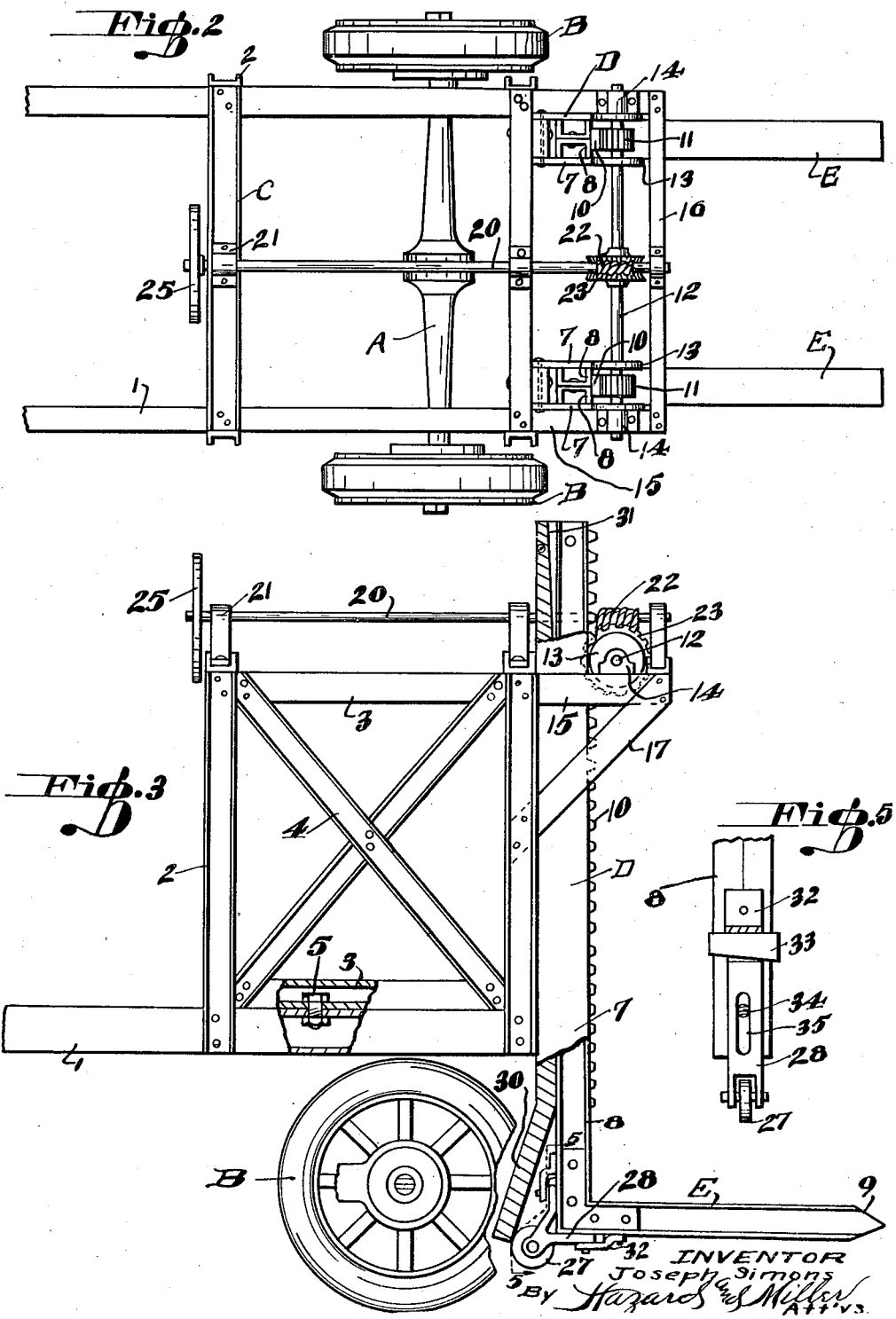

JOSEPH SIMONS, OF LOS ANGELES, CALIFORNIA.

LOADING AND UNLOADING MACHINE.

1,426,116.   Specification of Letters Patent.   Patented Aug. 15, 1922.

Application filed April 29, 1920. Serial No. 377,517.

*To all whom it may concern:*

Be it known that I, JOSEPH SIMONS, a citizen of the United States, residing at Los Angeles, in the county of Los Angeles and State of California, have invented new and useful Improvements in Loading and Unloading Machines, of which the following is a specification.

This invention is a loading and unloading machine comprising a mechanism arranged to be attached to a vehicle and adapted to be moved to a position beneath a load and to be elevated relative to the vehicle, so that the load may be transported by said vehicle or may be removed from the loading mechanism at an elevated point when it is simply desired to employ the mechanism as elevating means.

A mechanism constructed in accordance with the invention will be found to be applicable for a great variety of uses and upon a great variety of vehicles and it is to be understood that the invention contemplates the use of a mechanism such as will be hereinafter set forth upon any portion of any type of vehicle and for accomplishing any purpose involving the raising of a load.

Thus, for example, the improved machine may be mounted at either end or upon the side of a usual motor truck, or it may be similarly positioned upon any other vehicle, such as a wagon, freight car or truck or in fact upon any load carrier. In like manner it will be understood that the machine is applicable to a variety of uses, such as raising a load and transporting the same upon the vehicle to which the machine is attached, and then unloading the load by lowering the machine. The machine may also be employed for digging by forcing the loading mechanism into the material to be dug and then elevating the mechanism and dumping the load at any desired point. The machine will also be found to provide convenient means for simply elevating a load and unloading the load at any desired height without making use of the transporting possibilities afforded by mounting the machine upon a vehicle.

The invention will be readily understood from the following description of the accompanying drawings, in which—

Figure 1 is a side elevation of one embodiment of the invention showing the machine in position beneath a load ready to elevate the same.

Fig. 2 is a top plan view of the machine.

Fig. 3 is a side elevation thereof partly broken away.

Fig. 4 is an end view of the same.

Fig. 5 is a detail section on the line 5—5 of Fig. 3.

Fig. 6 is a detail longitudinal section of a modified form of the machine.

Fig. 7 is a detail end view of this form of the invention.

Fig. 8 is a transverse section on the line 8—8 of Fig. 6.

For the purpose of illustration and not as a limitation of the invention I have shown the machine positioned at the rear end of a motor truck A having wheels B and including the usual side bars 1 of the frame of the truck. The loading and unloading machine comprises members arranged to be moved to a position beneath the load by movement of the truck towards the load and operating mechanism for raising and lowering these members and the load resting thereon relative to the truck.

As an instance of this arrangement, a frame C is mounted upon the rear end of the truck frame and extends upwardly therefrom a substantial height. This frame is shown as comprising corner uprights 2 supported upon the side frames of the truck and, preferably, connected at their upper and lower ends by cross frames 3. Diagonal braces 4 may also be attached to the frame as thus formed and the entire frame is suitably secured to the side frames 1 of the truck as by bolts 5.

Vertical guide-ways D are provided at the rear of the frame C, these guide-ways, preferably, extending downwardly to points adjacent the ground level. These guide-ways are preferably arranged adjacent the respective sides of the truck frame and may comprise upright beams suitably secured to the frame C and having side plates 7 projecting therefrom to form vertically extending recesses, in which the elevating mechanism of the machine is arranged to slide.

The elevating mechanism, preferably, comprises a member slidable in each of the guide-ways, said members including laterally projecting arms E at their lower ends which extend beyond the mechanism, as thus far described, in parallel relation so as to be positioned beneath a load for supporting the same when the slidable members are moved up and down within their respective guide-ways.

These slidable members are each, preferably, formed of two channel irons 8 arranged back to back and suitably secured together, the arms E of the slidable members being, preferably, formed by bending the channel irons forming the slidable members at approximately right angles to the upright portions of said slidable members. The channel irons may taper at the ends of the arms E to form prongs 9 adapted to be more readily forced beneath a load.

The mechanism for raising and lowering the elevating members may comprise the following mechanism. Racks 10 extend lengthwise of the outer surfaces of the slidable members formed by channel irons 8, these racks being adapted to engage pinions 11 fixed upon a shaft 12 extending across the frame C. The shaft is, preferably, provided with rollers 13 loose thereon and engaging the sides of the guide-way for guiding the racks and pinions relative to one another. The shaft 12 may be journaled in bearings 14 upon extensions 15 of the upper cross bars of the frame C, these extensions being, preferably, braced by a cross bar 16 and by diagonal braces 17.

Any suitable means may be provided for rotating shaft 12 in reverse directions for raising and lowering the loading mechanism relative to the frame C. In the present embodiment of the invention manually actuated mechanism is shown for thus rotating shaft 12, although it will be obvious that suitable power mechanism may be employed for this purpose, as for example by mounting an engine upon the truck frame or by connecting the actuating mechanism with the motor of the truck. The mechanism illustrated comprises a shaft 20 extending at right angles to shaft 12 and journaled in bearings 21 upon cross bars of the frame C. This shaft is provided with a worm 22 meshing with a worm wheel 23 upon shaft 12 so that reverse rotation of shaft 20 will reversely rotate shaft 12 and thus raise or lower the elevating mechanism. The shaft 20 is shown as rotated by means of a handle wheel 25.

In Figure 1 the method of elevating the load by means of the loading mechanism is illustrated. Thus for example if a quantity of brick are to be moved from one position to another they may be stacked as shown at F upon a palette G which is elevated from the ground upon suitable frames H. The truck carrying the loading and unloading machine is then backed up to the brick and the loading mechanism being in a lowered position the arms E are run in under the palette G. By now turning the handle wheel 25 the loading mechanism with the brick supported thereon may be elevated and the truck moved to any place where it is desired to unload the brick. By then lowering the elevating mechanism the palette G may be lowered to suitable supports and the arms E removed from beneath the load by moving the truck forward.

In order to properly load the arms E it may be necessary to slope the latter downwardly slightly towards their outer ends as clearly shown in Figure 1, and this downward slope is liable to be increased when the load is upon the arms since the weight of the load will cause depression of the rear end of the truck upon its frame. Under these conditions there is a possibility of the load sliding from the supporting arms after it has been elevated, and means are therefore, preferably, provided in conjunction with the elevating mechanism for tilting the latter as it is raised to swing the ends of the arms upwardly and thereby prevent sliding of the load from the arms.

As an instance of this arrangement, a roller 27 may be journaled in a bracket 28 so as to project beyond the uprights and laterally extending arms of each side of the elevating mechanism. This roller is adapted to engage the base of the guideway D as the elevating mechanism is raised so as to swing the lower end of the elevating mechanism away from the guide-way and thereby tilt the outer end of the arm E upwardly. In order that this tilting of the arm E may be gradually accomplished the lower end of guide-way D is preferably bent away from the elevating mechanism as shown at 30. By this arrangement the elevating mechanism in its lowered position is adapted to abut against the base of the guide-way D with the roller 27 resting against the portion of the guide-way bent away from the elevating mechanism. When now the elevating mechanism is raised, the roller passing over the surface 30 will gradually swing the elevating mechanism away from the guide-way until the roller engages the main portion of the base of the guide-way and then as the raising of the mechanism continues the roller passing over this main portion of the guide-way will hold the lower end of the elevated mechanism in outwardly tilted position for tilting the arm E as previously described. This outward tilting of the lower end of the elevated mechanism will cause a corresponding inward tilting of the upper end of the elevated mechanism. The upper end of the base of guide-way D gradually slopes away as shown at 31 to permit of this tilting movement.

The degree to which the elevating mechanism will be tilted is, preferably, adjustable by means of mechanism arranged to change the relative position of the roller 27 with regard to the elevating mechanism. This adjusting means may comprise brackets 32 loosely received over the respective ends of bracket 28 for retaining the latter in position upon the elevating mechanism, but at the same time permitting of longitudinal adjustment of the bracket 28 relative to either the upright of the elevating mechanism or the laterally extending arm thereof, and to a sufficient degree for accomplishing the required adjustment of roller 27. For this purpose a wedge 33 is arranged to be driven between each end of bracket 28 and the bracket 32 as clearly shown in Figure 5, it being understood that sufficient lost motion is provided between the bracket 28 and bracket 32 to permit of the necessary adjustment of bracket 28. The wedges are provided in various sizes, so that the bracket 28 may be variably positioned relative to the elevating mechanism by employing wedges of various widths. Bolts 34, preferably, extend through brackets 32 and the ends of bracket 28 into the channel bars forming the elevating mechanism for guiding the adjustment of the bracket 28, these bolts, preferably, being received in elongated slots 35 provided in the ends of bracket 28.

In the modification of the invention illustrated in Figures 6, 7 and 8, the elevating mechanism is employed as a device for digging and loading earth. In this embodiment of the invention the uprights comprising the slidable members at the opposite sides of the elevating mechanism are, preferably, connected by a frame 37 forming the rear of a digging bucket and the arms E of the elevated mechanism are similarly connected by a base 38 forming the base of this bucket. In this arrangement the arms E are, preferably, hinged to the uprights of the elevating mechanism so that they may be lowered relative to the uprights for dumping the load contained within the bucket formed upon the elevating mechanism. As an instance of this arrangement, the arms E are made separate from the slidable uprights of the elevating mechanism and the ends thereof opposite the digging ends 9 are provided with side plates 40 extending up and outside the opposite sides of the respective uprights of the elevating mechanism with pivot pins 41 extending through these side plates and the uprights of the elevating mechanism. The arms E thus arranged to swing relative to the slidable uprights are, preferably, normally locked in position at substantially right angles to the uprights, said locking means having manually controlled means for releasing the lock to permit of dumping movement of the arms. For this purpose a rod 42 may extend across the frame of the elevating mechanism, said rod being journaled in bearings 43 upon the respective uprights of the elevating mechanism and having an operating handle 44 for rocking the rod. The ends of the rod are connected by links 47 with fingers 45 slidable in guideways 48 and arranged to normally extend down in front of the side plates 40 for locking the arms E against pivotal movement. When, however, it is desired to dump the load the rod 42 may be rocked so as to slide fingers 45 from in front of the side plates 40 and thereby permit dumping movement of the arms E.

When the elevating mechanism is employed as a digger as above described and the arms E are arranged for dumping movement relative to the slidable uprights, instead of a bucket being formed on the arms E as above described, a series of teeth may be arranged between the arms E in parallel relation thereto, so as to form a fork. A construction as thus described may be employed as a hay lifter or for digging into and elevating any other material which may be supported upon a fork arrangement as thus set forth.

Various changes may be made without departing from the spirit of the invention as claimed.

What is claimed is:

1. The combination with a vehicle, of an upright frame, an elevating means slidable along said frame and having a projecting portion arranged to engage beneath a load, said frame and elevating means having cooperating surfaces arranged to tilt said elevating means when at the bottom of said frame so as to lower the outer end of said load engaging portion of the elevating means.

2. A device of the character described including a frame, elevating mechanism slidable along the same, a contact member extending beyond said elevating mechanism at its lower end, and a contact surface upon said frame at its lower end and inclined relative to the same for engagement by said contact member to tilt the elevating mechanism when the latter is lifted, said frame having a space at the upper end forming clearance for the upper end of said elevating mechanism when thus tilted.

3. A device of the character described including a frame, elevating mechanism slidable along the same and having a projecting portion at its lower end arranged to extend beneath the load to be elevated, a contact member extending beyond said elevating means at its lower end and arranged to engage said frame for tilting said projecting portion of the elevating means, and means for adjusting said engagement to regulate the tilt of said elevating means.

4. A device of the character described including a frame, load elevating means slidable relative to said frame and having a projecting portion arranged to be positioned beneath the load, means for tilting said elevating means relative to said frame, said load engaging portion of the elevating means being arranged for downward swing relative to said elevating means, and means for locking said load engaging portion of the elevating means in upwardly swung position.

5. The combination with a vehicle, of a frame, elevating means movable along the frame and having a projecting portion arranged to engage beneath the load, and co-acting means on the frame and elevating means arranged to tilt the elevating means when at the bottom of said frame so as to lower the outer end of the projecting portion.

6. A device of the character described comprising a frame, elevating means movable along the frame and having a projecting portion arranged to engage beneath the load, and co-acting means on the frame and elevating means arranged to tilt the elevating means when at the bottom of said frame so as to lower the outer end of the projecting portion.

In testimony whereof I have signed my name to this specification.

JOSEPH SIMONS.